United States Patent [19]

Wanner et al.

[11] 4,288,187

[45] Sep. 8, 1981

[54] ARRANGEMENT FOR PRODUCING GROOVES

[75] Inventors: Karl Wanner, Leinfelden-Echterdingen; Wilbert Reibetanz, Leinfelden; Hans-Peter Dohse, Grafenau; Otto Baumann, Leinfelden-Echterdingen; Dietmar Spiwokz, Stuttgart; Karl Seitz, Oberkochen; Ernst Angermair, Bietigheim-Bissingen; Herbert Wiesner, Leinfelden, all of Fed. Rep. of Germany

[73] Assignee: Robert Bosch GmbH, Stuttgart, Fed. Rep. of Germany

[21] Appl. No.: 28,429

[22] Filed: Apr. 9, 1979

[30] Foreign Application Priority Data

Apr. 5, 1978 [DE] Fed. Rep. of Germany ....... 2814672
Feb. 17, 1979 [DE] Fed. Rep. of Germany ....... 2906235

[51] Int. Cl.[3] ............................................... B23C 1/20

[52] U.S. Cl. ................................ 409/180; 51/170 T; 51/176; 299/39; 299/41; 409/182

[58] Field of Search ............... 409/175, 181, 182, 180; 51/170 T, 176; 408/67; 299/39, 41; 173/47

[56] References Cited

U.S. PATENT DOCUMENTS

| | | | |
|---|---|---|---|
| 1,923,159 | 8/1933 | McLaren | 409/181 |
| 1,990,991 | 2/1935 | Heubach | 409/182 X |
| 2,238,304 | 4/1941 | Belanger | 409/218 X |
| 2,625,860 | 1/1953 | Plester | 409/181 |
| 2,813,432 | 11/1957 | Hoskins | 51/176 X |
| 3,913,447 | 10/1975 | Roche | 409/138 |
| 3,955,607 | 5/1976 | Roche | 409/182 X |
| 3,964,212 | 6/1976 | Kården | 51/170 T |

FOREIGN PATENT DOCUMENTS

| | | | |
|---|---|---|---|
| 504928 | 8/1951 | Belgium | 299/41 |
| 2302167 | 9/1976 | France | 408/67 |
| 739203 | 10/1955 | United Kingdom | 299/39 |

*Primary Examiner*—William R. Briggs
*Attorney, Agent, or Firm*—Michael J. Striker

[57] ABSTRACT

An arrangement for producing grooves in walls, ceilings and the like with the use of a hand-held processing machine, has a rotatable material-removing tool driven in rotation by the machine, and a housing surrounding the tool. The housing has a guiding piece through which the tool extends. The guiding piece has a guiding surface which is adapted to lie on the surface of the wall, ceiling and the like, and is inclined at an acute angle relative to the axis of the tool. The guiding piece is detachably mounted on the processing machine.

34 Claims, 11 Drawing Figures

195
196
179
193
192
197
191
199
194
165
153
177
167
198
178
190
181
163
156
154
115
164
170
168
172
166
158
180
101
102
182
187
186
185
184
183
189

ARRANGEMENT FOR PRODUCING GROOVES

BACKGROUND OF THE INVENTION

The present invention relates to an arrangement for producing grooves.

In order to lay pipes, cables, transmission lines and the like, grooves must be produced in surfaces of walls, ceilings and the like, which are constituted by masonry and/or concrete with or without coating. It is known to produce such grooves by groove bits or hollow bits which are subjected to impacts from hand-held electrical or pneumatic hammers. These methods which utilize such bits do not make possible to limit the depth of the grooves. The groove depth depends on skill of the operator, and the bit moves at a substantially identical angle corresponding to the hardness of material of the wall, ceiling and the like.

It is also known to utilize arrangements which are formed as milling machines. Known milling machines for producing grooves in masonry have a device by which the groove depth can be adjusted and limited. The tools of these arrangements are formed as a rotatable movable disc miller provided with cutting lammelas of hard alloy. Such a tool is expensive. In conditions of unskilled applications, which must always be taken into account in construction industry, the tool can be damaged or destroyed. It has a further disadvantage that the regrinding of the cutting lamellas is very complicated and requires special grinding wheels and grinding machines. It is also known that during operation of conventional machines, a great amount of dust is produced which generally is hazardous to the health of the operator and leads to dirtying of the operational site. It is also known to mount a collecting bag on a pipe of the housing so as to form a collecting arrangement which accommodates the dust generated during production of the groove. This dust-accumulating bag is connected directly with the housing and therefore is not only disturbing during movement but also is dangerous since it can be torn off, damaged or otherwise failed. The manipulation of these machines with such a dust-accumulating bag is thereby difficult. It is also disadvantageous that in this case a machine must be utilized, which is designed especially for producing grooves and cannot be utilized for other applications. This requires high expenditures which are amortized only during long time, and also requires special transportation of known masonry groove-milling machines which is also expensive.

SUMMARY OF THE INVENTION

Accordingly, it is an object of the present invention to provide an arrangement for producing grooves, which can operate with a tool which is simpler and less expensive than a hard alloy disc miller, which is effective in processing of hard rock material, and which is guided within a groove to be produced, similarly to the disc miller.

It is another object of the present invention to provide an arrangement utilized as a forepart of an available machine which may be used for other applications and may be of various types.

It is also a further object of the present invention to provide such an arrangement in which a tool can be mounted fast, without difficulties, without special skill and auxiliary instruments, and which tool provides for umimpeded transportation of material removed during operation without bulky and susceptible to damage devices.

In keeping with these objects and with others which will become apparent hereinafter, one feature of the present invention resides, briefly stated, in an arrangement which has a material removing tool driven in rotation by a hand-held processing machine, and a housing provided with a detachable wedge-shaped guiding piece which has a contact or guiding surface adapted to lie on a wall or ceiling wherein a groove is to be produced, the guiding surface being inclined at an acute angle to an axis of the tool.

Advantageously, the tool is a hollow drill having a cutting head at a front end, a longitudinal hole extending from the front end to a rear end, and a transverse hole communicating with the longitudinal hole so as to form a passage for transporting material removed by the cutting head of the tool, whereas the tool extends through and guides the guiding piece.

In such a construction, the tool is simpler, less expensive and the operation of the tool is simplified as compared with the tools utilized in known arrangements. The inventive arrangement is a forepart which can be mounted easily and fast on an available processing machine which latter can also be utilized for other operation, especially as hammer drill delivering impacts. It is only necessary to insert the hollow drill into the tool holder of the hammer drill, and to set and fix the guiding piece on an immovable part of the machine. The guiding piece is non-rotatably connected with the machine and is secured against axial displacement relative to the latter. This is performed by a single clamping element, for example by a clamping screw which does not require special skill and auxiliary tools. The guiding piece thereby is guided on the tool. Since the guiding surface of the guiding piece is inclined relative to the tool axis at an acute angle, the tool is also inclined to a wall, ceiling and the like when the machine together with the guiding piece and the hollow drill is placed on the surface in which a groove is to be produced. This angle of inclination determines the depth of the groove to be produced. In order to start drilling, the machine is placed approximately normal to the surface of the wall, ceiling and the like. The machine, particularly a hammer drill, delivers light rotary blows against the material through the hollow drill. When this preliminary drilling is sufficient to guide the hollow drill in the material, the processing machine together with the guiding piece and the hollow drill is inclined toward the wall, ceiling and the like so that the contact and guiding surface of the guiding piece is laid and moves on the wall, ceiling and the like along a guiding mark. Therefore, a groove is produced whose depth depends on the above-mentioned angle of inclination. At the same time, at the tip of the hollow drill and in the region of its cutting head inside the latter, plugs of the material having a length from 5 to 20 mm are formed. The hollow drill is additionally guided by these plugs in the region of its front end with the inner cutting edges of the cutting head. The plugs of the material extend at the angle of inclination of the contact and guiding surface of the guiding piece, whereas the processing machine together with the guiding piece and the tool moves parallel to the surface of the wall, ceiling and the like. When the plugs of material reach a certain length, they break up. Drillings and particles of material are transported through the longitudinal and transverse holes in the hollow drill and thereafter are withdrawn through an outlet passage of the housing by a suction device. As long as the plugs of the material are generated, the hollow drill is guided at its front end in the material not only by the outer edges of the cutting head and the outer diameter of the tool, but also in the inner region of the cutting edges of the cutting head. When the plugs of the material break up, the hollow drill moves at its front end within the groove and is guided only in the region of the outer cutting edges of the cutting head and the outer diameter of the tool. This automatic guiding of the hollow drill in the region of its front end prevents clamping of the tool and reduces loading of the cutting head. Since the tool is constructed as a hollow drill, particles of the material removed during operation and the above-mentioned plugs of material are transported through the interior of the tool and the guiding piece, for example by suction. A suction conduit may be fitted on a suction pipe of the housing, the pipe bounding an outlet passage of the housing. The suction conduit is advantageously flexible and may be formed as a separate suction device. The thus-constructed device provides for unimpeded evacuation of the material removed during operation without bulky and susceptible to damage arrangements. The suction conduit mounted on the guiding piece operates during the service life of the processing machine, together with the guiding piece and the hollow drill.

In accordance with another feature of the present invention the cutting head is composed of a plurality of cutting lamellas mounted on a body of the tool. The cutting lamellas are constituted by a hard metal or alloy, whereas the body of the hollow drill is constituted by hardened steel. The cutting lamellas may extend radially inwardly and outwardly beyond the body by 1-2 mm. Since in this case the material expenditures are low, the costs of the tool is also low.

In accordance with still another important feature of the present invention, the inner diameter of the longitudinal and transverse holes of the hollow drill exceeds the diameter of a circle which is described by inner edges of the cutting lamellas. The diameter of the circle described by the inner edges of the cutting lamellas defines the diameter of the plugs of material which are produced during operation. Since the diameter of the longitudinal and transverse holes of the hollow drill are larger that the diameter of this circle and, therefore, than the diameter of the plugs of material, the latter can unimpededly pass through the hollow drill.

A further feature of the present invention is that the hollow drill has an insertion pin at its rear end, which pin is insertable in and adjustable in the tool holder of the machine. At the same time, the hollow drill may be composed of a front portion carrying the cutting head, a rear portion carrying the insertion pin, and a middle portion connecting the front and rear portions with each other, of which front portion or rear portion may be detachably and interchangeably connected with the middle portion. The processing machine may be formed as a hammer drill which, with a small pressing force, can process and deliver impacts against the material wherein the groove is to be produced. In the above-mentioned construction the cutting head can be fast and easily replaced by another cutting head. Thereby the costs of the tool are significantly reduced by the interchangeability of the cutting head. The efficiency of the arrangement is increased. The insertion pin which has a cross-section matching a receiving portion of the tool holder of the machine and is easily insertable and removable, also contributes to easy interchangeability. The arrangement with the pin of the matching cross-section can be mounted in a hammer drill of each type and can be utilized with various types of hammer drills.

Still a further feature of the present invention is that the hollow drill is mounted in the guiding piece so that it can rotate but cannot axially displace relative to the latter, for example with the aid of snap connection. Thereby, the guiding piece is retained on the hollow drill in the axial direction.

In accordance with yet a further feature of the present invention the guiding piece has a throughgoing guiding hole through which the hollow drill extends and which is inclined relative to the contact and guiding surface at an acute angle so that the guiding hole and the guiding surface together form a wedge whose apex faces toward the cutting head. The cutting head of the hollow drill extends forwardly beyond the guiding hole. The guiding piece has a rear annular passage, a suction pipe with an outlet passage which opens into the annular passage and communicates with a suction device, and a suction conduit fittable on the suction pipe. The annular passage, the outlet passage of the suction pipe and the suction conduit have an inner diameter which exceeds the diameter of a circle described by the inner edges of the cutting lamellas of the cutting head. In such a construction, the plugs and the particular material which is produced during operation, can be unimpededly transported through the hollow drill into the suction device.

An important feature of the present invention is that during the milling or cutting operation the hollow drill is guided in the region of its cutting head, that is in its front region. This is attained by providing a handle, advantageously a ball handle, at the front end of the guiding piece and at a side which is opposite to the contact and guiding surface of the guiding piece. The ball handle is located at the same circumferential region at which the suction pipe of the guiding piece is located. By taking hold of this ball handle the hollow drill can be held, guided and manipulated in the region of the cutting head. Therefore, the cutting head may be reliably guided along the guiding mark provided on the surface of a wall, ceiling or the like.

In accordance with a further feature of the present invention, the guiding hole of the guiding piece has a diameter which is so selected, relative to the outer diameter of the hollow drill, that the guiding piece is reliably guided radially on the hollow drill. This is possible because the guiding piece is mounted on the hollow drill with a snap action and in such a way that the hollow drill can rotate relative to the guiding piece. As a result of this, the guiding piece may be mounted on an immovable part of the processing machine so as not to rotate or become axially displaced relative to the latter. Particularly, it can be mounted on a hammer drill or, when a hollow bit is utilized, on a power hammer.

An additional feature of the present invention is that the guiding piece is provided at its rear end with a holding shackle which has a connecting pin insertable into a further handle. The connecting pin can be fixed to the handle by a clamping screw. A hole in the handle and a portion of the connecting pin which is insertable into this hole, may have a hexagonal cross-section. The above-mentioned portion of the connecting pin may be provided with a plurality of successively arranged grooves and projections. Thus the guiding piece can be connected with the handle which is detachably mounted on the processing machine. Therefore, the arrangement is held, guided and manipulated by the handle at the rear end, and also by the handle at the front end of the guiding piece. The guiding piece may be constituted of a synthetic plastic material, for example a glass-fiber-reinforced polyamide, and the connecting pin may be injection-molded into the guiding piece. The guiding hole of the guiding piece may be inclined relative to the contact and guiding surface at an angle within the range of 10° and 30°, so that the groove depth can be varied.

In accordance with yet an additional feature of the present invention, the guiding piece may be provided with an advantageously metallic guiding member which defines the contact and guiding surface of the guiding piece and is adjustably mounted on the latter. Due to this, the angle between the guiding hole and the contact and guiding surface may be varied. At the same time, the metallic guiding member prevents wear of the guiding piece of synthetic plastic material.

In many cases which depend on the groove depth and width, as well as on the material to be processed, the utilization of a hollow drill with an inner guiding section which cuts the material encounters some difficulties. It is desirable to provide at the front of the machine an arrangement which can utilize tools of differing lengths and diameters, and which at the same time can guarantee fast and simple interchangeability of the arrangement. This would make possible to produce grooves of differing width and depth, for example, within the range of 30-65 mm, with the utilization of known tools in the same arrangement.

In order to attain these objects and in accordance with a further feature of the present invention, the tool is formed as a cross-bit having a shaft and a cruciform cutting head, the latter having a guiding portion formed as an axially extending centering point with cutting blades. A holding device is provided so as to detachably connect the guiding piece to the processing machine, the holding device being adjustable relative to the tool in the longitudinal direction in dependence upon differing lengths of the tools used, and also being adjustable about a transverse axis in dependence upon differing diameters of such tools.

A cross-bit is known per se. However, it solves special problems here, in connection with the arrangement forming a forepart for producing grooves in a material, particularly in a hard rock material, with highly advantageous results. In dependence upon the bit diameter, grooves of corresponding width and depth are produced at considerable working speed. The guidance of the cutting head of the cross-bit is performed by the forepart of the machine. The centering point of the cross-bit serves as a guiding element and secures the front end of the drill against slipping out of the groove. Since the wedge-shaped guiding piece is displaceable in the longitudinal direction, length differentials of the drills and the tool holders in different machines can be compensated. Since the arrangement can rotate in circumferential direction, drills of differing diameters can be utilized, extending at an acute angle relative to the contact and guiding surface of the guiding piece. The adjustment of the longitudinal and angular position can be performed quickly, simple and without difficulties. The general concept is, therefore, that cross-bits of differing dimensions for producing grooves of differing depths and diameters can be utilized. At the same time, the arrangement can be adjusted quickly and simply in dependence upon the dimensions of a particular tool. The arrangement may operate with or without an additional suction device. In the latter case, the removed material can be discharged through one or more openings provided in the guiding piece.

The guiding piece may be formed as a U-shaped slide shoe in the interior of which the tool is accommodated so that the cutting head extends radially outwardly and the centering point extends forwardly beyond the slide shoe. The guiding piece may be provided with guiding members defining the contact and guiding surface and formed as bent-off portions of the guiding piece. A suction pipe may be arranged at a front end of the slide shoe. On the other hand, the above-mentioned opening or openings may also be provided at the leading end of side walls of the slide shoe for automatically evacuating the material removed during the operation.

A baffle plate may be located between the walls of the slide shoe and displaced toward the machine. Dust and the material removed during the operation enter a thus-formed closed chamber wherefrom they can be evacuated by a suction device or through the openings in the side walls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
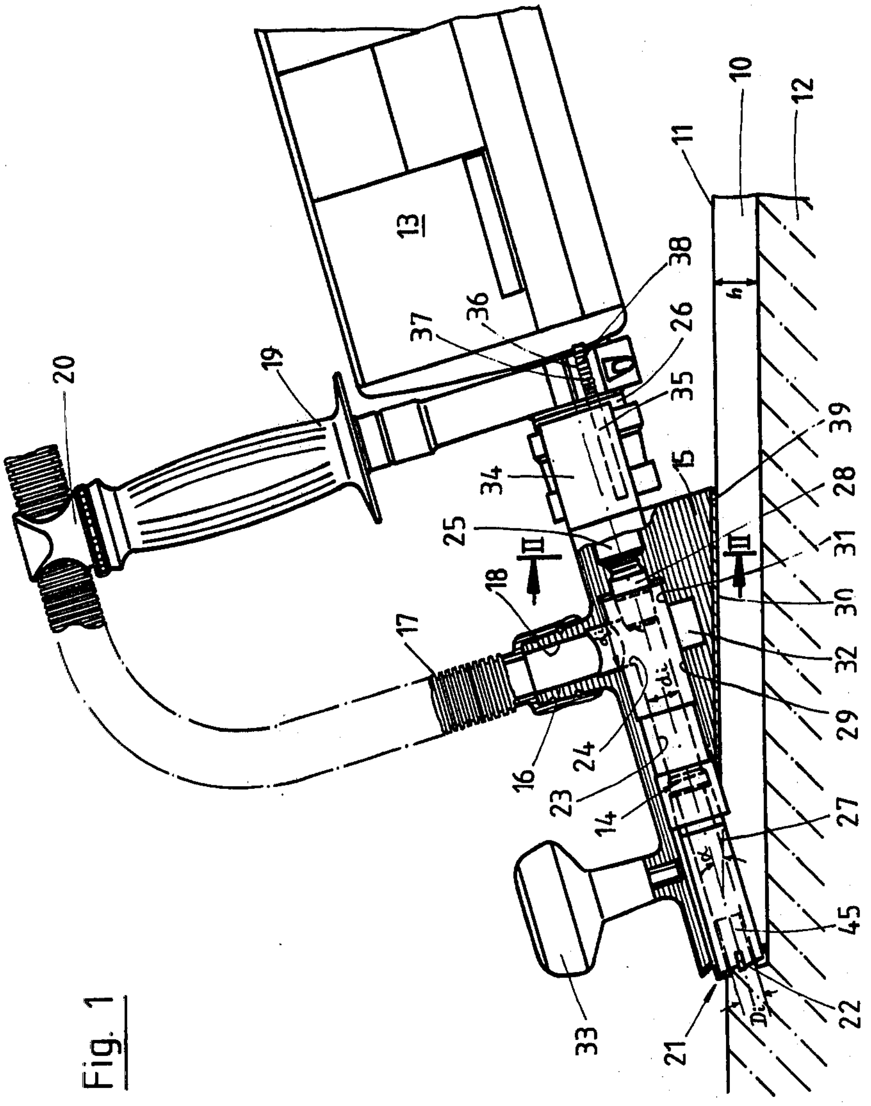
FIG. 1 is a partially sectioned side view of a hammer drill with an arrangement for producing grooves, during operation.

FIG. 1 shows an arrangement for producing a groove 10 in a surface 11 of a wall 12 of masonry, concrete or the like, with the use of a hand-held processing machine, such as a hammer drill 13 which is known per se in the art. A tool is utilized which is continuously driven in rotation and subjected to axial strikes by the hammer drill 13. The tool is formed as a hollow drill 14 performing a milling action. The hollow drill is surrounded by a housing which is constructed as a guiding piece 15 constituted, for example, by glass-fiber-reinforced polyamide. The guiding piece 15 has a projection which is formed as a suction pipe 16 connected with a not-shown suction device, such as a dust exhauster. Material which is removed during producing of a groove, or more particularly, during milling of the groove, is aspirated through an outlet passage 18 of the suction pipe 16 and the suction conduit 17 when the above-mentioned suction device is actuated, without raising any dust.

A handle 19 is detachably mounted on an immovable part of the hammer drill 13 in a known manner, so that the arrangement can be supported by hand. The suction conduit 17 extends to the handle 19 and is connected with the latter by a clamp 20. The hollow drill 14 has a cutting head 21 which is mounted at a free front end (or the left end as considered in FIG. 1). The cutting head 21 carries, at its front end, plumbed cutting lamellas 22 which are constituted by hard alloy or hard alloy chips. The diameter of a circle which is described by radially inner cutting edges of the cutting lamellas 22 is identified by $D_i$.

The hollow drill 14 has an inner longitudinal passage 23 having a first end which is open in the region of the cutting head 21 and a second end which is spaced from the cutting head 21 and merges into a transverse hole 24 which, in turn, freely opens in a radial direction. The longitudinal hole 23 and the transverse hole 24 together form a transport passage for the removed material. The inner diameter $d_i$ of the longitudinal hole 23 and of the transverse hole 24, as well as the inner diameter of the outlet passage 18 and of the suction conduit 17, are greater than the diameter $D_i$ of the circle which is described by the radially inner cutting edges of the cutting lamellas 22. The hollow drill 14 is constituted, with the exception of the cutting lamellas 22, of hardened steel.

The end of the hollow drill 14 which is opposite to the cutting head 21 is provided with a projection or pin 25. The latter has an engaging profile which is insertable into and lockable in a receiving portion or a hole of a tool holder 26 of the hammer drill 13, so as to connect the hollow drill 14 with the hammer drill 13. This is known per se in the art and does not require to be disclosed in more detail. The pin 25 mates with the receiving portion of the tool holder 26.

Figure 3:
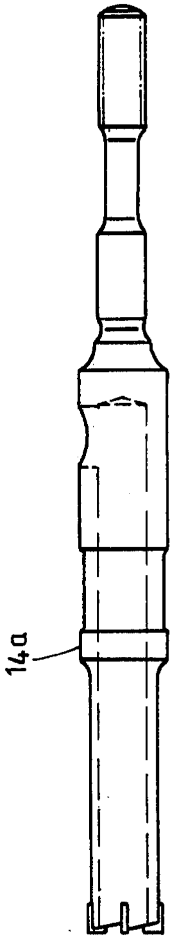
FIG. 3 is a side view of a hollow drill utilized in the inventive arrangement.
Figure 4:
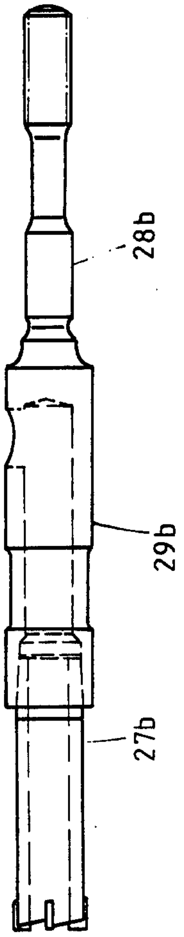
FIG. 4 is a schematic side view of a hollow drill in accordance with another embodiment of the invention.

In accordance with the embodiment shown in FIG. 1, the hollow drill is composed of several parts, in particular of three parts. It has a shaft portion 27 with the cutting head 21, on the one hand, a shaft portion 28 with the plug 25, on the other hand, and a middle portion 29 located between the first-mentioned two portions so that the shaft portion 27 and 28 are detachably and interchangeably connected with one another. In accordance with the second embodiment shown in FIG. 3, the hollow drill 14 is formed as a one-piece member, whereas in accordance with the third embodiment shown in FIG. 4, the hollow drill 14 is composed of two parts. In the latter case, a shaft portion **28*b* and a middle portion 29*b* are of one piece with each other, and only a left shaft portion 27*b* is detachably and interchangeably connected with the middle portion 29*b***.

The guiding piece 15 is substantially wedge-shaped and is penetrated over its entire length by the hollow drill 14 which simultaneously guides the guiding piece radially. At the lower side of the guiding piece 15, as considered in FIG. 1, it is provided with a contact or guiding surface 30 which extends in inclined relationship with and at an acute angle to the longitudinal hole 23 of the hollow drill 14. The guiding piece 15 has a guiding hole 31 through which the hollow drill 14 extends and which forms, together with the contact or guiding surface 30, a wedge having a tip which faces toward the cutting head 21. The hollow drill 14 extends outwardly beyond the guiding hole 31 by its cutting head 21. The hollow drill 14 is retained in the guiding hole 31 rotatable relative to the guiding piece 15, but is fixed to the latter in axial direction by means, for example, of snap connection which is known per se in the art.

The guiding piece 15 has, in an axial region of the transverse hole 24 of the hollow drill 14, an inner annular passage 32 with which an open radial end of the transverse hole 24 communicates. The annular passage 32, in turn, communicates with the output passage 18 of the suction conduit 16. The axial width of the annular passage 32 is also greater than the diameter $D_i$ of the circle which is described by the radially inner cutting edges of the cutting lamellas 22.

The guiding piece 15 carries at its free front end (the left end in FIG. 1), a member which is shaped as a ball handle 33. The latter extends transverse to the guiding hole 31 and is located at the side which is opposite to the contact or guiding surface 30 of the guiding piece 15. The ball handle 33 has a threaded projection which is firmly screwed in an inner thread of a mounting projection of the guiding piece 15. With the aid of the ball handle 33, the guiding piece 15 together with the hollow drill 14 can be held, guided and manipulated in the region of the cutting head 21.

The suction pipe 16 is axially spaced from the ball handle 33 and mounted at the same circumferential location at which the ball handle 33 is located. Both these elements are mounted on the upper surface of the guiding piece 15, as can be seen from FIG. 1, and extend substantially normal to the guiding hole 31.

In order to mount the guiding piece 15 on the hollow drill 13, the guiding piece 15 is provided, at its rear end opposite to the cutting head 21, with a lateral holding shackle 34. The latter has a connecting pin 35 produced by injection molding and extending substantially parallel to the guiding hole 31. The connecting pin 35 has a free projecting portion 36 which is inserted into a hole 37 of the handle 19 and is locked in the latter against rotation and longitudinal displacement. Locking is attained by a not-shown clamping bolt in the handle 19, by means of which the pin portion 36 is fixed to the handle 19 and thereby to the hammer drill 13. In addition to this an axial guiding surface and/or a radial guiding surface of the guiding piece 15 may contact with or be fixed to an immovable part of the hammer drill 13. This is not shown in the drawing for the sake of clarity. The connecting pin 35 and the hole 37 have a hexagonal cross-section which guarantees firm and uninterrupted mounting of the guiding piece 15 on the hammer drill 13 without relative rotation. The portion 36 of the connecting pin 35 is provided with successively arranged raised and depressed sections, such as a knurling 38, in order to provide additional protection against axial displacment.

As can be seen from FIG. 1, the guiding piece 15 has metallic slide members 39 defining the contact or guiding surface 30. This reduces wear of the guiding piece 15 which is constituted of synthetic plastic material.

Figure 2:
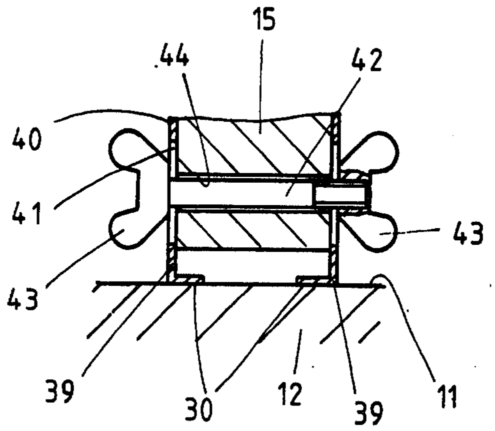
FIG. 2 is a section along line II—II of FIG. 1 and showing a part of a guiding piece with adjustable sliding members.

The slide members 39 may be formed as a U-shaped one-piece slide shoe or as separate slide members arranged at both sides of the guiding piece 15 as shown in FIG. 2. The slide members 39 are adjustably mounted on the guiding piece 15. For this purpose lateral walls 40 of each slide member 39 have upwardly extending elongated slots 41. A clamping bolt 42 extends through the slots 41 and a transverse hole 44 in the guiding piece 15, and is tightened by a wing nut 43 so as to fix both slide members 39 to the guiding piece 15. By means of the thus-adjustable slide members 39, the angle of inclination $\alpha$ of the contact or guiding surface 30 relative to the longitudinal axis of the guiding hole 31 may be adjusted as desired. Thereby, the depth h of the groove 10 to be produced can also be adjusted. In contrast to the embodiment shown in FIG. 2, on slide shoe having a continuous contact or guiding surface 30 may be provided instead of two separate slide members 39. The angle of inclination $\alpha$ may be, in dependence upon the depth h of the groove 10, equal to substantially 10°–30°.

In order to produce the groove 10, the following steps are performed. The pin 25 of the hollow drill 14 is inserted into the tool holder 26 of the hammer drill 13 and locked in the latter. Simultaneously the knurled portion 36 having a hexagonal cross-section is inserted into the hexagonal hole 37 of the handle 19 and is locked there by the clamping bolt which can simultaneously lock the handle 19 in a desired circumferential position. One end of the suction conduit 17 is fitted on the suction pipe 16 of the guiding piece 15, whereas the other end of the same is connected with a not-shown suction device, such as a dust exhauster. The thus-assembled arrangement is ready to use and is held by the handle 19 at its rear end and by the ball handle 33 at its front end. In order to drill the groove 10, the hammer drill 13 with the tool is placed approximately normal to the surface 11 of the wall 12. When the suction device is actuated and the hammer drill 13 is switched on, the hollow drill 14 rotates and also performs an axial blow against the surface 11 of the wall 12. The removed material is aspirated through the hollow drill 14. Particularly, the removed material is aspirated from the cutting head 21 through the longitudinal hole 23, the transverse hole 24, the circular passage 32, the outlet passage 18, and the suction conduit 17. When the groove in the wall 12 is sufficently deep so as to automatically guide the hollow drill 14 at its free front end in the region of the cutting head 21, the hammer drill 13 is inclined to the wall 12. The slide members 39 of the guiding piece 15 lie on the surface 11 of the wall 12 and move lengthwise of the latter along a guiding mark so as to produce the groove 10. Small plugs 45 of drilled-out material, having a length substantially between 15 and 20 mm are formed in the hollow drill 14 in the hollow interior of the cutting head 21. The hollow drill 14 is automatically guided at its front end (the left end in FIG. 1), that is in the region of its tip in the groove 10. The hollow drill is retained and guided by the outer periphery of the cutting head 21. In addition to this, the hollow drill 14 is also guided by the inner edges of the cutting lamellas 22 of the cutting head 21 since these inner edges are guided on the continuously formed plugs 45 of drilled out material. The diameter of the plug of drilled out material 45 is determined by the inner diameter $D_i$ of the cutting head 21. The plugs of the drilled out material 45 extend at the angle of inclination $\alpha$ of the guiding piece 15. The movement of the hammer drill 13 together with the guiding piece 15 and the hollow drill 14 is performed parallel to the surface 11 of the wall 12. When the plug 45 of drilled out material reach a certain length, they break up. The broken up plug 45 and the removed particulate material, that is dust-like drillings, are aspirated by the suction device through the hollow drill 14 and the suction conduit 17. The aspiration of the broken up plug of drilled out material 45 encounters no difficulties since the diameters of all transport passages through which the plug 45 must pass, are greater than the outer diameter of the plugs. During the drilling process the whole tool is guided in the region of the cutting head 21, that is in the region of its tip. More particularly, this guidance is accomplished by holding the handle 19 and the ball handle 33 by hand, each in one hand, and by automatically guiding the inner and outer edges of the cutting lamellas 22 of the cutting head 21 in the material which is drilled.

When it is necessary to change the angle of inclination $\alpha$, this can be performed by releasing the wing nuts 43 and effecting relative movement of the slide members 39 on the guiding piece 15, either upwardly or downwardly, as can be clearly seen from FIG. 2.

In accordance with another, not shown embodiment of the present invention, the tool is formed as a conventional drill which is received in a drill chuck of a hand-operated drilling machine. The shaft of the drill extends through the guiding piece and outwardly beyond the free end of the latter, and the length of the extended portion of the shaft can be adjusted. The guiding hole is so large in the region wherein the drill shaft extends, that the latter can freely rotate, and the guidance of the guiding piece on the drill shaft is provided. In the region wherein the guiding piece faces towards the drilling machine, the guiding piece has a receiving hole which is larger than the outer diameter of the drill chuck. The drill chuck of the drilling machine is so received in this receiving hole that the drill chuck can freely rotate. The guiding piece is retained on an immovable part of the drilling machine below the drill chuck, for example by a clamping bolt. In this embodiment aspiration of the removed particulate material through the drill and the guiding piece is not possible. The aspiration in this case must be performed in the region where the drill extends outwardly beyond the guiding piece and engages the outer surface of the wall at an angle of inclination relative to the latter.

An arrangement in accordance with a further embodiment of the present invention is shown in FIGS. 5–11. In these Figures parts of the arrangement are identified by numbers starting from 100 in order to avoid repetition of the numerals in the description of preceding Figures.

Figure 5:
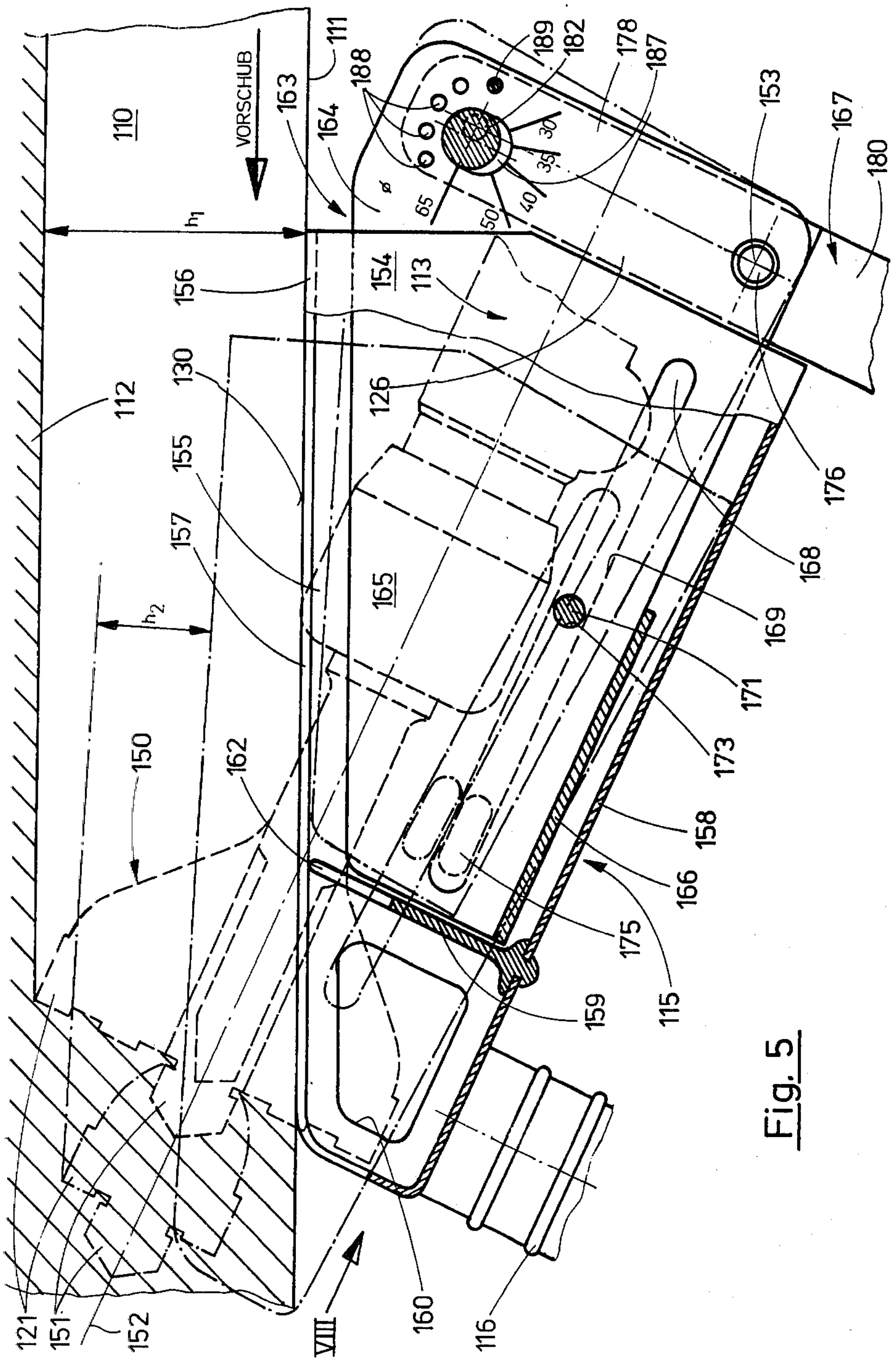
FIG. 5 is a section taken along line V—V of FIG. 6 and showing a part of a hammer drill with an arrangement for producing grooves in accordance with a further embodiment of the present invention during the operation on a vertical wall.
Figure 6:
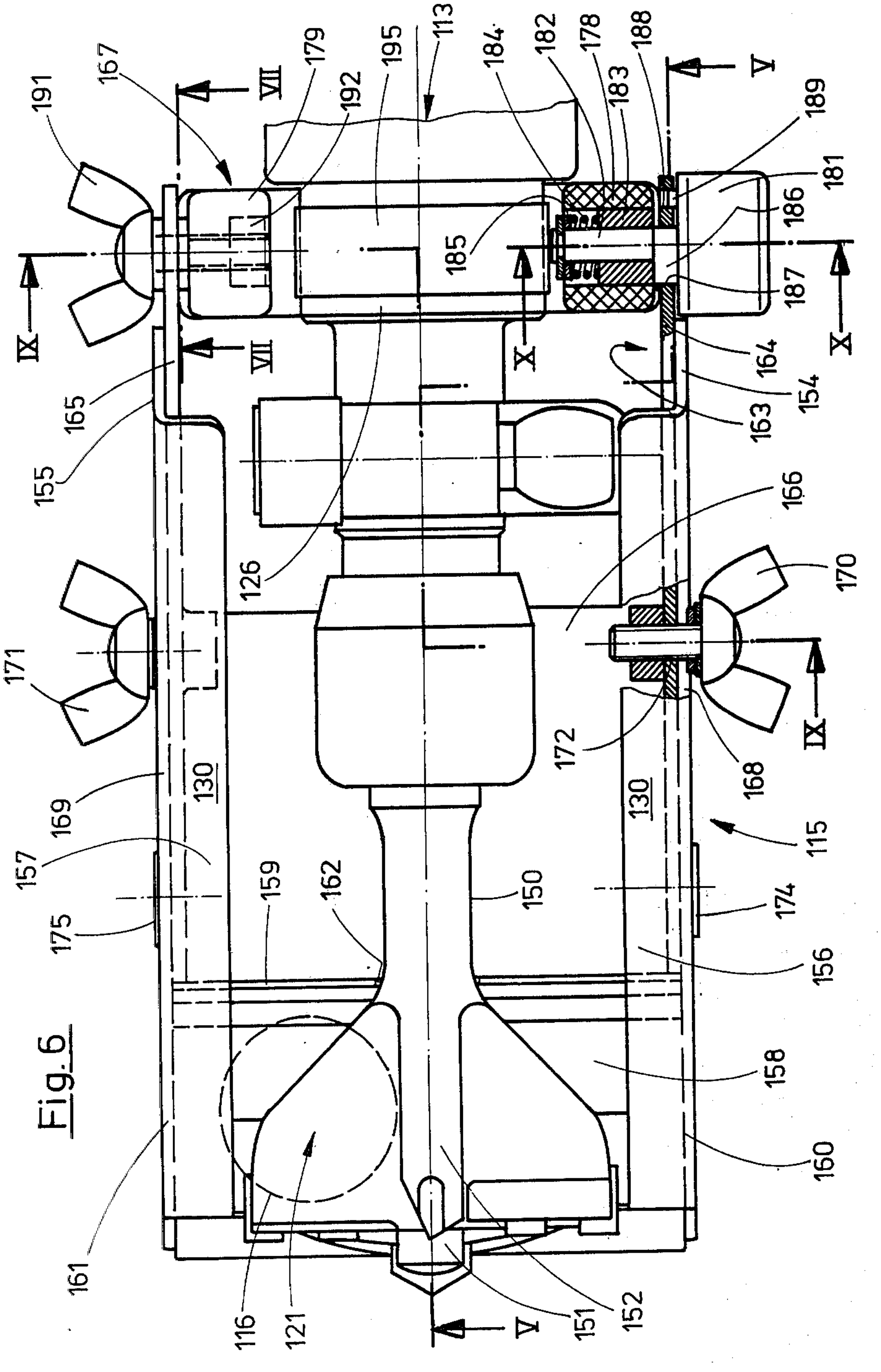
FIG. 6 is a partially sectioned plan view of the arrangement of FIG. 5.

The arrangement in accordance with this embodiment has a tool which is formed as a cross-bit 50 with a cruciform cutting head 121. At least for working on weak structure, a hollow bit can also be utilized. The cross-bit carries a front guiding element which is formed as a centering point 151 constituted by hard alloy. In FIG. 5 dotted lines are utilized for one cross-bit 150, whereas dash-dot lines are utilized for another cross-bit. The cross-bits utilized in the arrangement may have differing lengths and differing diameters. Correspondingly, grooves 110 to be produced may have differing depths h1 or h2 (as shown in FIG. 5) and widths. A guiding piece 115 formed as a wedge-shaped shoe is detachably connected with a hammer drill 113 by a holding device. In order to adjust the length differential of various cross-bits 150 and the tool holder 126 in different hammer drills 113, the guiding piece 115 is adjustable in the longitudinal direction of axis 152 of the cross-bit 150 relative to the latter. Thereby, the length differential of various drills and the tool holder can be compensated. Furthermore, in order to compensate for the diameter differential of the cross-bit 150, the guiding piece 115 is adjustable in a circumferential direction and lockable relative to an axis 153. The axis 153 extends transverse to an axis 152 of the tool and below the same as can be seen in FIGS. 5 and 6. The circumferential adjustment about the axis 153 permits a user to adjust the setting angle between the tool axis 152 and a contact or guiding surface 130 of the guiding piece 115. The guiding piece 15 moves at this angle lengthwise of a surface 111 of a wall 112 which is, for example vertical, in the feed direction identified by the arrow.

The guiding piece 115 is formed as a slide shoe which has an approximately U-shaped cross-section and will be later so referred to. It is manufactured from sheet metal by cutting and folding. Both lateral walls 154 and 155 of the guide shoe have a substantially triangular contour. They carry, at their upper free ends, guiding members 156 and 157 which are inwardly deformed and strip-shaped. The guiding members 156 and 157 form the contact or guiding surface 130 of the slide shoe 115.

The cross-bit 150 is received into the interior of the U-shaped slide shoe between the lateral walls 154 and 155 and a bottom 156. The cross-bit 150 is so located that its cruciform cutting head 121 extends radially outwardly beyond the contact or guiding surface 130 of the guiding members 156 and 157, and that the centering point 151 extends to the left freely outwardly beyond the front end of the slide shoe 115.

In the front end region, the slide shoe carries a suction pipe 116 which is open into the interior of the U-shaped slide shoe. A not shown suction conduit communicates the suction pipe 116 with a not shown dust exhauster. Each lateral wall 154 and 155 is provided, at a location corresponding to the height of the suction pipe 116, with a substantially trapeze-shaped outlet opening 160 and 161, respectively. When a vertical wall 112 is being worked on, these outlet openings 160 and 161 are always located below so that when the suction through the suction pipe is not utilized, the removed material passes through these outlet openings located below.

At a distance from the front end, that is to the right from the suction pipe 116 and the outlet openings 160 and 161 in FIGS. 5 and 6, the slide shoe 115 has an inner baffle plate 159. The latter is constituted, for example, of rubber. The baffle plate 159 extends as a partition from one lateral wall 154 to the other lateral wall 155 and to the bottom 158. The baffle plate has a recess 162 in the region of its upper edge (FIG. 8) for receiving the bit shaft located axially behind the cruciform cutting head 121 of the cross-bit 150. The baffle plate hinders flinging away of the removed material rearwardly, that is in the direction toward the hammer drill 113.

A component of the holding device for the slide shoe 115 is a sliding carriage 163 with lateral walls 164 and 165 which form a trapeze-shaped or a triangle-shaped surface element. The walls 164 and 165 are connected with each other by a transverse member 166 so as to form a one-piece structure. The sliding carriage is constituted by a shaped sheet part produced, for example, by bending of a blank. The slide shoe 115 with its lateral walls 154 and 155 is detachably and fixably held in the slide carriage 163 so as to extend substantially parallel to the tool axis 152. The side walls 154 and 155 have elongated slots 168 and 169, respectively. The slots 168 and 169 have a considerable length and extend substantially parallel to the bottom 168. The slide shoe 115 is held on the lateral walls 164 and 165 of the slide carriage 163 by two wing bolts 170 and 171. The latter extend through the elongated slots 168 and 169 of the side walls 154 and 155 and through openings 172 and 173 in the lateral walls 165 and 165 of the slide carriage 163.

Nuts are located at the inner side of the walls 164 and 165. They may be welded to these walls. By loosening of the wing bolts 170 and 171 the clamping connection between the slide shoe 115 and the slide carriage 163 is unlocked. The slide shoe 115 can then be displaced along the elongated slots 168 and 169 relative to the slide carriage 163, for matching the length differential.

Additional means for securing during this displacement and also against torque is provided. This means includes slide elements formed as slide blocks 174 and 175, pins or the like which are located on the lateral walls 164 and 165 of the slide carriage 163 at a longitudinal distance from the wing bolts 170 and 171. The slide blocks 174 and 175 engage in and completely match the elongated slots 168 and 169. Tightening of the wing bolts 170 and 171 provides for a fixed relative position between the slide shoe 115 and the carriage 163.

As can be seen particularly from FIGS. 5 and 6, the rear end portion or the left portion, as considered in the drawing, of the lateral walls 164 and 165 extend rearwardly beyond the respective end of the slide shoe 115. A fork 167 which is constituted, for example, by aluminum, engages inbetween the latteral walls 164 and 165. The fork 167 is a component of the holding device. It is clamped on the tool holder 126 of the hammer drill 113. The slide carriage 163 is held on the fork 167 rotatable about the axis 153 and is fixable in each circumferential position. The axis 153 extends at the lower end of the end portion of the lateral walls 164 and 165 which is adjacent to the fork. The axis 153 is defined by pivot pins 176 and 177 which are received in the fork 167 and engage in bearing holes of the lateral walls 164 and 165 so as to serve as bearings. Arms 178 and 179 of the fork 167 together form a U-shaped profile. As can be seen from FIG. 9, the fork has a grip 180 which extends downwardly and is of one-piece with the arms 178 and 179.

An adjustment knob 181 with a hinge pin 182 is mounted above the axle 153. The hinge pin 182 sits in a bush 183 which is fixedly held in the arm 178 of the fork 167. A spring 184 abuts against the inner end of the bush 182, the end facing toward the interior of the fork. The spring 184 may be formed, for example, as a cylindrical helical spring. It may also be formed as an elastic disc-shaped member of rubber or synthetic plastic material. The other end of the spring 184 is prestressed and urges the adjustment knob 181 elastically to the position shown in FIGS. 6 and 10. The adjustment knob 181, under the action of axial compression of the spring 184, is extensible outwardly of the bush 183 by a predetermined axial magnitude. At the same time, it retains its support due to the hinge pin 182. The adjustment knob 181 carries a disc-shaped eccentric 186 between its outer handle and hinge pin 182. The eccentric 186 is received in an elongated opening 187 in the end portion of the neighboring lateral wall 164 of the slide carriage 163. This end portion of the latteral wall 164 further has several locking holes 188 arranged on a circular arc. In the drawings, five such holes 188 are shown. The holes are provided on a scale graduated in accordance with the diameters and having graduation marks 30,35,40,50 and 65, respectively, which correspond to the diameters of the cross-bits.

The adjustment knob 181 carries a locking pin 189 which is fixedly connected to the former. The locking pin 189 extends in the same direction in which the hinge pin 182 extends, but is radially spaced from the latter and relatively short. By rotation of the adjustment knob 181 to a respective circumferential position, the locking pin 189 engages axially in one of the locking holes 188. In the example shown in FIG. 5, the position corresponding to a cross-bit having a diameter 65 is selected. When it is necessary to vary this position, the adjustment knob 181 is pulled out against the force of the spring 184 so that the locking pin 189 is withdrawn from the locking hole 188. After this, the adjustment knob 181 can be moved to another circumferentially spaced postion. The graduation mark 190 is to be brought in registry with the diameter scale. When the adjustment knob 181 is released, the released spring 184 pulls the adjustment knob 181 automatically into the locking position shown in FIG. 8.

Figure 7:
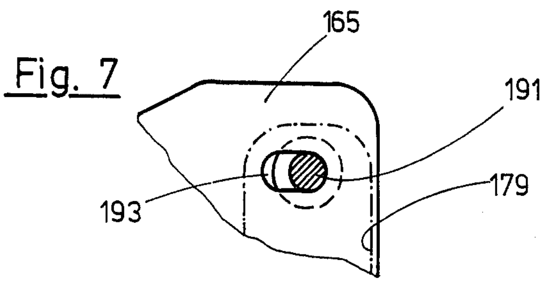
FIG. 7 is a section taken along line VII—VII of FIG. 6.
Figure 8:
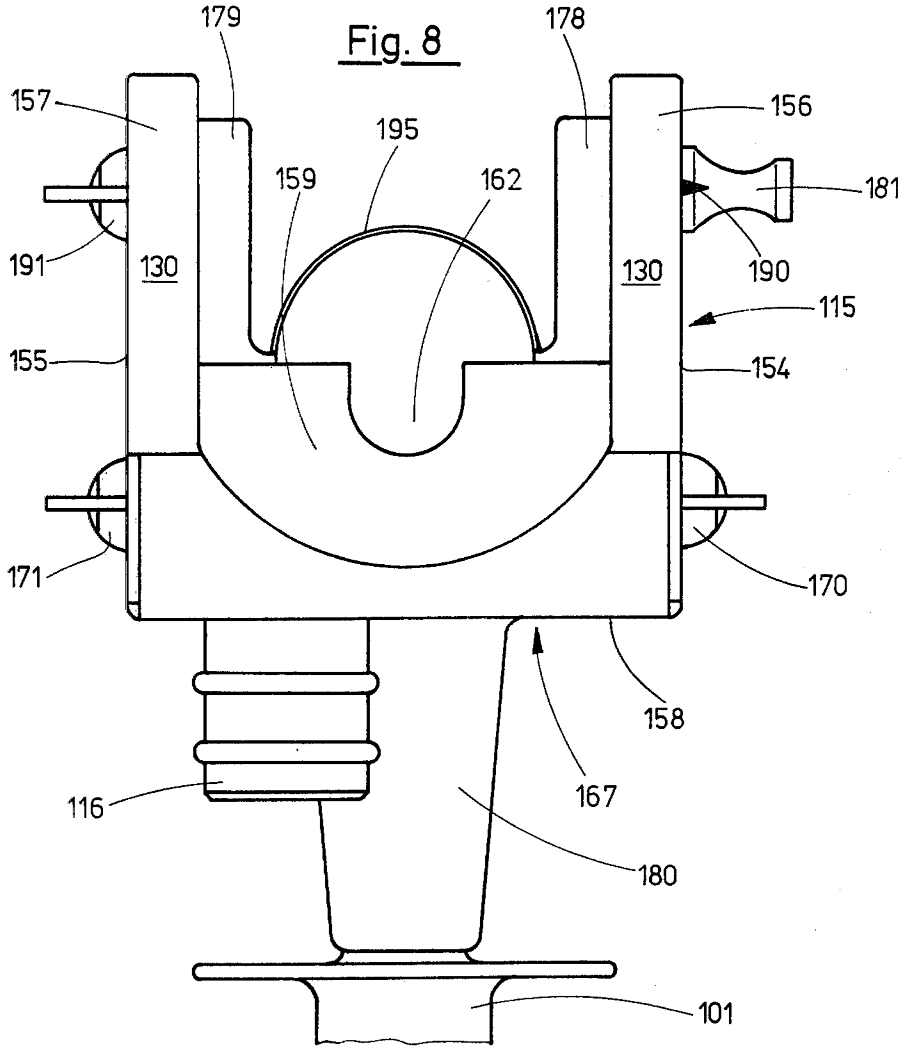
FIG. 8 is a front view of the arrangement, looking in the direction of arrow VIII of FIG. 5.

As can be seen particularly from FIG. 7, a wing bolt 191 engages the other arm 179 of the fork above the axis 153. The axis of the wing bolt 191 is substantially in alignment with the axis of the hinge pin 182 of the adjustment knob 181. The wing bolt 191 is screwed into a nut 192 which is received in the arm 179 of the fork 167 so as not to rotate relative to the latter. The wing bolt 191 extends through the end portion of the lateral wall 165 in which a recess shaped as an elongated slot 193 is provided. The slot 193 is shaped slightly arcuately about the axis 153. By means of the wing bolt 191 the circumferential position adjusted by the adjustment knob 181 can further be secured by tightening of the wing bolt 191.

Figures 9, 10, 11:
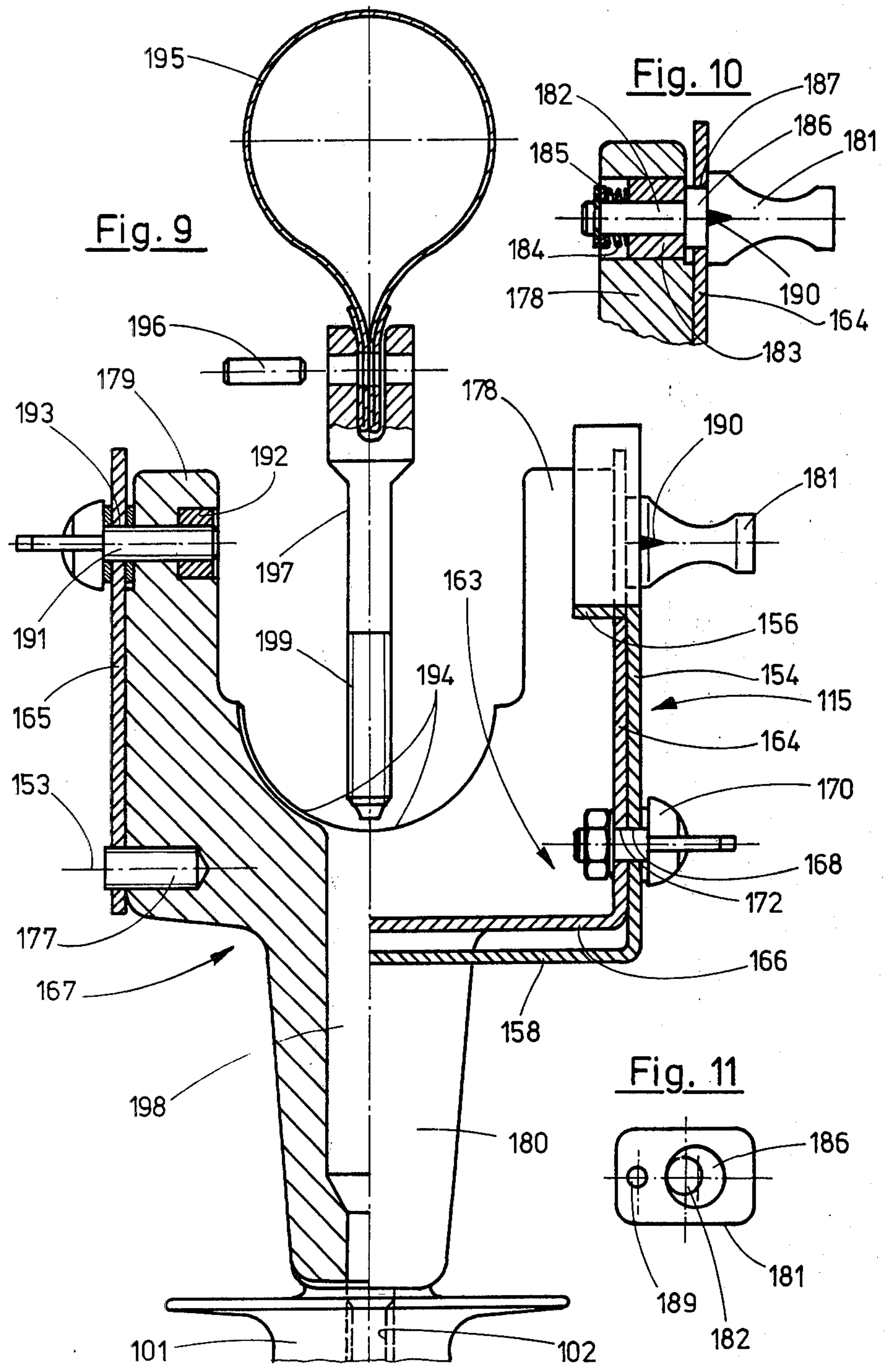
FIG. 9 is a view showing a section taken along line XI—XI in FIG. 6 with a partially sectioned side view of a detachable tensioning device.
FIG. 10 is a view showing a section along line X—X of FIG. 6.
FIG. 11 is a side view of an adjustment knob in FIG. 10.

In order to mount the fork 167 on the hammer drill 113, particularly on the tool holder 126 of the latter, the fork 167 is provided in the region between the arms 178 and 179 with a substantially semicircular depressed supporting surface 194 which is located centrally above the handle 180. The fork 167 lies on the tool holder 126 with the supporting surface 194 and is clamped thereon. The clamping is performed by a clamping band 195, for example of metal, which is bent so as to form a circular tube and is fixed at one end to a locking bolt 197 by means of a bolt 196 extending transverse to the latter. The handle 180 of the fork 167 has a recess formed as a groove or as a hole 198, as shown, which extends centrally between the arms 178 and 179 of the fork 167 substantially parallel to the arms. The locking bolt 197 is received in the hole 198 so that it cannot rotate but can be axially displaced by at least such distance that its threaded portion 199 at the free end, as shown in FIG. 9, extends downwardly beyond the hole 198. An additional handle 101 having an inner threaded hole 102 is screwed on the thus-extending end portion of the locking bolt 197. By rotation of the additional handle 101, the threaded portion 199 is screwed axially deeper in the threaded hole 102. The fork 167 is clamped on the hammer drill 113 by the thus-tightened clamping band 195.

The position of the arrangement during operation is illustrated in FIG. 5, wherein the cross-bit 150 having a diameter of 65 is mounted in the arrangement, as shown in dotted lines. The adjustment of the circumferential or anglular position of the slide carriage 163 relative to the fork 167 for the tool diameter 65 is performed in the above-described manner by the adjustment knob 181. It assumes the position shown in FIG. 5. In order to adjust the slide shoe 115 in correspondence with the length of the cross-bit shown in dotted lines, the wing bolts 170 and 171 are unlocked so that the slide shoe 115 can move relative to the slide carriage 163 in the direction parallel to the tool axis 152. It has been recognized that the longitudinal adjustment is advantageously such that not the entire cutting head 121, but only the centering point 151 of the cross-bit 150 extends forwardly beyond the slide shoe 115. After this, the slide shoe 115 is fixed in this position relative to the slide carriage 163 by tightening of the wing bolts 170 and 171. If the slide carriage 163 is not secured relative to the fork 167 in the adjusted circumferential position, then the wing bolt 191 must also be firmly tightened. When it is necessary to aspirate the removed material, then a conduit connected with a dust exhauster is attached to a suction pipe 116. However, the arrangement can also operate without aspiration. In this case the material removed from the vertical wall 112 falls downwardly through one of the outlet openings 160 and 161.

Before assuming the position relative to the surface 111 of the wall 112 which is shown in FIG. 5, the centering point 151 must first engage in the wall material, such as masonry or concrete. The centering point 151 of the cross-bit 151 must be placed on the guiding mark by manipulating the hammer drill 113 and thereafter the hammer drill is switched on. The tool axis 152 extends substantially normal to the surface 111. First, the centering point 151 cuts into the wall material. When the hammer drill 113 is turned with the above-described arrangement, the cutting of the whole cross-section by the cutting head 121 begins. The hammer drill 113 is gradually inclined from the normal position to the inclined position relative to the wall 112, as shown in FIG. 5, until finally the guiding members 156 and 157 of the slide shoe 115 lie on the surface 111 of the wall 112 by their contact or guiding surface 130. The hammer drill 113 can now be guided by its guiding members 156 and 157 on the slide shoe 115 and can move lengthwise of the surface 111 in the feed direction. Thereby, the groove 110 having the depth hl is produced. The centering point 161 of the cross-bit 150 runs tightly below the surface 111 of the wall material. This prevents slipping out of the cross-bit 150 from the groove 110. The working angle between the tool axis 152 and the surface 111 of the wall 112 amounts to approximately 25°.

The above-described arrangement provides for the following highly advantageous results. It can be utilized for the hammer drills of differing dimensions, that is such which, for example, have greater or smaller shafts. The locking band 195 makes it possible to overlap a great diameter range of the tool holders 126. The arrangement can operate with cross-bits 150 of differing dimensions, for example, in the diameter range from 30 mm to 65 mm. Special tools are not required, since the arrangement corresponds to the commerical sizes and customs. The guidance of the illustrated cross-bit 150 of hard material wherein a groove is to be made, such as concrete, is performed automatically by the cross-bit itself. The setting of the arrangement when a particular cross-bit 150 or hammer drill 113 is utilized is performed easily and fast by making an adjustment in longitudinal and in circumferential directions relative to the axis 153. The centering point 151 of the cross-bit 150, which is inclined at a predetermined angle to the surface 111 of the wall 112, prevents slipping out of the cross-bit 150 from the groove which is produced. Grooves of differing depths and widths can be produced in a simple manner and not only in weak structures but also in very hard structures, such as concrete. The production of the grooves is performed by a combined rotary and percussion action. It is also possible to utilize a hollow bit having an inlet so that the material removed during production of the groove is aspirated through the hollow bit from the working zone.

It will be understood that each of the elements described above, or two or more together, may also find a useful application in other types of constructions differing from the types described above.

While the invention has been illustrated and described as embodied in an arrangement for producing a nut, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for producing grooves in walls, ceiling and like elements of a structure by a hand-held processing machine having a tool holder, comprising a rotatable material-removing tool having an axis and driven in rotation about said axis by the processing machine, and a housing including a substantially wedge-shaped guiding piece having a bottom wall and two lateral walls and adapted to receive said tool and a slide element mounted on said guiding piece and defining a guiding surface inclined at an acute angle to said axis of the tool and adapted to lie in contact with a wall or ceiling to be machined, said slide element having two opposite members defining said guiding surface, and positioned so as to provide a clearance therebetween through which said tool extends, said tool including a cross-bit having a shaft and a cruciform cutting head on said shaft, said cutting head having a guiding portion which is formed as an axially extending centering point provided cutting blades; and a holding device arranged to detachably connect said guiding piece to the processing machine and adjustable relative to said tool in a longitudinal direction of the latter in dependence upon differing lengths of said tool and the tool holder, and also adjustable about a further axis extending transverse to said axis of said tool which accompanying adjustment of said acute angle in dependence upon differing diameters of said tool, each of said guiding members being a bent-off portion of a respective one of said lateral walls of said guiding piece.

2. An arrangement as defined in claim 1, wherein said guiding piece is formed as a U-shaped slide shoe in which said lateral walls are substantially triangular walls having free edges, said members being strip-shaped, said tool being located in the interior of said U-shaped slide shoe so that its cutting head extends radially outwardly beyond said guiding surface of said slide shoe and said centering point extends forwardly beyond said slide shoe.

3. An arrangement as defined in claim 2, wherein said cutting blades are constituted by hard alloy.

4. An arrangement as defined in claim 2, wherein said slide shoe has a front end and a suction pipe at said front end, said suction pipe being open into the interior of said U-shaped slide shoe.

5. An arrangement as defined in claim 2, wherein each of said lateral walls has a front portion and a discharge opening in said front portion arranged for discharging material removed by said tool.

6. An arrangement as defined in claim 2, wherein said slide shoe has a front end and a baffle plate located rearwardly of said front end at a distance therefrom, said baffle plate extending between and up to said side walls and said bottom wall of said slide shoe.

7. An arrangement as defined in claim 6, wherein said baffle plate is constituted by rubber.

8. An arrangement as defined in claim 6, wherein said baffle plate has an upper edge and is provided in the region of said upper edge with a recess for receiving said shaft of said tool.

9. An arrangement as defined in claim 8, wherein said shaft of said tool extends rearwardly from said cutting head, said recess of said baffle plate being arranged to receive said rearwardly extending shaft of said tool.

10. An arrangement as defined in claim 2, wherein said holding device has two side plates, said side walls of said slide shoe being held on said side plates of said holding device so that said side walls are detachable from and fixable to said lateral plates and said side walls are movable relative to said side plates substantially parallel to said axis of said tool.

11. An arrangement as defined in claim 10, wherein each of said lateral walls of said slide shoe has an elongated slot extending substantially parallel to said bottom wall, each of said side plates of said holding device having an opening; and further comprising a plurality of two-side screws each extending through one opening of one side plate of said holding device and through one elongated slot of a respective one of said side walls of said slide shoe and tightenable in a plurality of adjusting positions, whereby each of said lateral walls of said slide shoe is pulled to a respective one of said side plates of said holding device and is fixed and clamped to the same.

12. An arrangement as defined in claim 11, wherein said screws are wing screws.

13. An arrangement as defined in claim 11, wherein each of said side plates of said holding device has an inner surface and an outer surface, each of said side walls of said slide shoe being pulled to at least one of said surfaces of a respective one of said side plates of said holding device.

14. An arrangement as defined in claim 11, wherein each of said plates of said holding device has a sliding element which is longitudinally spaced from a respective one of said screws, each of said lateral walls of said slide shoe having a further elongated slot in which a respective one of said screws engages.

15. An arrangement as defined in claim 14, wherein said sliding element is a sliding block.

16. An arrangement as defined in claim 14, wherein said sliding element is a pin.

17. An arrangement as defined in claim 11, wherein said holding device further includes a transverse plate which connects said side plates with each other so as to form together a slide carriage, said side plates being substantially flat and having a decreasing cross-section, said slide carriage being located in the interior of said U-shaped slide shoe and having a rear portion which extends toward the processing machine and rearwardly outwardly beyond said slide shoe.

18. An arrangement as defined in claim 17, wherein said side plates of said slide carriage are substantially trapeze-shaped.

19. An arrangement as defined in claim 17, wherein said side plates of said slide carriage are triangular.

20. An arrangement as defined in claim 17, wherein said holding arrangement further includes a fork clampable in the processing machine, said side plates of said slide carriage having an end portion which are held by said fork so that they are rotatable about said further axis between a plurality of circumferential positions and fixable in each of said circumferential positions.

21. An arrangement as defined in claim 20, wherein said processing machine has a tool holder, said fork being fixable with the tool holder of the processing machine.

22. An arrangement as defined in claim 20, wherein said fork is constituted by aluminum.

23. An arrangement as defined in claim 20, wherein each of said side plates of said slide carriage has a lower section and is provided with a bearing hole, said further axis extending in the region of said lower sections of said side plates and being defined by hinge pins which extend through said bearing holes of said side plates of said slide carriage and into said fork at respective sides of the latter.

24. An arrangement as defined in claim 20, wherein said fork has two prongs; and further comprising an adjustment knob located rotatably in one of said prongs above said further axis and axially movable in an axial direction with spring-biasing returning said knob to an initial position, said adjustment knob having an axial end provided with an eccentric and engaging one of said side plates of said slide carriage so as to perform eccentrical adjustment of the latter.

25. An arrangement as defined in claim 24, wherein said one side plate of said carriage has a receiving hole, said eccentric of said adjustment knob engaging in said receiving hole.

26. An arrangement as defined in claim 25, wherein said receiving hole is formed as an elongated slot in said one side plate.

27. An arrangement as defined in claim 24, wherein said one side plate of said slide carriage has a plurality of adjustment openings which are spaced from one another, said adjustment knob having a locking pin so that when said adjustment knob moves between a plurality of circumferential positions to one of said circumferential positions corresponding to a particular diameter of said tool, said locking pin engages in a respective one of said adjustment openings under the action of said spring-biasing.

28. An arrangement as defined in claim 24; and further comprising a screw located above said further axis and engaging in the other prong of said fork, said screw having an axis which is in alignment with that of said adjustment knob and being formed as a clamping screw, the other side plate of said slide carriage having an opening through which said clamping screw extends.

29. An arrangement as defined in claim 28, wherein said clamping screw is a wing screw.

30. An arrangement as defined in claim 28, wherein said opening on the other wall is formed as an elongated slot which has an arcuate contour described about said further axis.

31. An arrangement as defined in claim 20, wherein the processing machine has a tool holder, said fork having two prongs and a central substantially semicircular supporting surface between said prongs, said supporting surface being arranged so that said fork lies and is fixed to the tool holder by said supporting surface.

32. An arrangement as defined in claim 31, wherein said fork has a grip and a throughgoing opening extending through said grip substantially parallel to said prongs of said fork; and further comprising a clamping bolt having two spaced end portions and insertable into said throughgoing opening of said grip so that one of said end portions of said clamping bolt is located inside of said fork whereas the other end portion of said clamping bolt is threaded and located outside of said fork; and further comprising means on said one end portion and operative for holding the tool holder of the processing machine, and means for tightening said clamping bolt and thereby the tool holder by pulling the other threaded end portion of said clamping bolt.

33. An arrangement as defined in claim 32, wherein said holding means includes a clamping band arranged to fit on the tool holder and carried by said one end portion of said clamping bolt.

34. An arrangement as defined in claim 32, wherein said tightening means includes an additional grip which is screwed on said other end portion of said clamping bolt and abuts against said grip of said fork.

* * * * *